United States Patent
Namiki

(10) Patent No.: US 9,578,235 B2
(45) Date of Patent: Feb. 21, 2017

(54) IMAGE PROCESSING APPARATUS, CONTROL METHOD, AND RECORDING MEDIUM FOR PROCESSING AN IMAGE SIGNAL FOR WHICH A FOCUS STATE CAN BE CHANGED AFTER IMAGE CAPTURE

(71) Applicant: CANON KABUSHIKI KAISHA, Tokyo (JP)

(72) Inventor: Kazuhiro Namiki, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/515,962

(22) Filed: Oct. 16, 2014

(65) Prior Publication Data
US 2015/0109483 A1   Apr. 23, 2015

(30) Foreign Application Priority Data
Oct. 18, 2013 (JP) .................................. 2013-217860

(51) Int. Cl.
*H04N 5/232* (2006.01)
(52) U.S. Cl.
CPC ...... *H04N 5/23229* (2013.01); *H04N 5/23212* (2013.01)
(58) Field of Classification Search
CPC ............ H04N 5/23229; H04N 5/23212; G06T 2207/10052; G06T 2200/21
USPC .......................................................... 348/349
See application file for complete search history.

(56) References Cited

U.S. PATENT DOCUMENTS

| 4,410,804 A | 10/1983 | Stauffer | |
|---|---|---|---|
| 2009/0136148 A1* | 5/2009 | Lim ................... | H04N 5/23212 382/255 |
| 2012/0243101 A1* | 9/2012 | Nagasaka ............ | H04N 5/2254 359/619 |
| 2013/0222633 A1* | 8/2013 | Knight ............... | H04N 5/23293 348/222.1 |
| 2013/0250167 A1* | 9/2013 | Nagasaka .......... | H04N 5/23229 348/360 |
| 2013/0329125 A1* | 12/2013 | Hamano ............ | H04N 5/23212 348/349 |
| 2014/0219576 A1* | 8/2014 | Yokoyama ......... | H04N 5/23212 382/255 |

FOREIGN PATENT DOCUMENTS

JP    2009-021919 A    1/2009

* cited by examiner

*Primary Examiner* — Gevell Selby
(74) *Attorney, Agent, or Firm* — Cowan, Liebowitz & Latman, P.C.

(57) ABSTRACT

An image processing apparatus detects a focus state of obtained LF data, and changes methods for recording the LF data, depending on the focus state. At this time, the image processing apparatus records a reconstructed image generated from the LF data without recording the LF data when the focus state of the LF data is an in-focus state, and records the LF data when the focus state of the LF data is in an out-of-focus state.

12 Claims, 7 Drawing Sheets

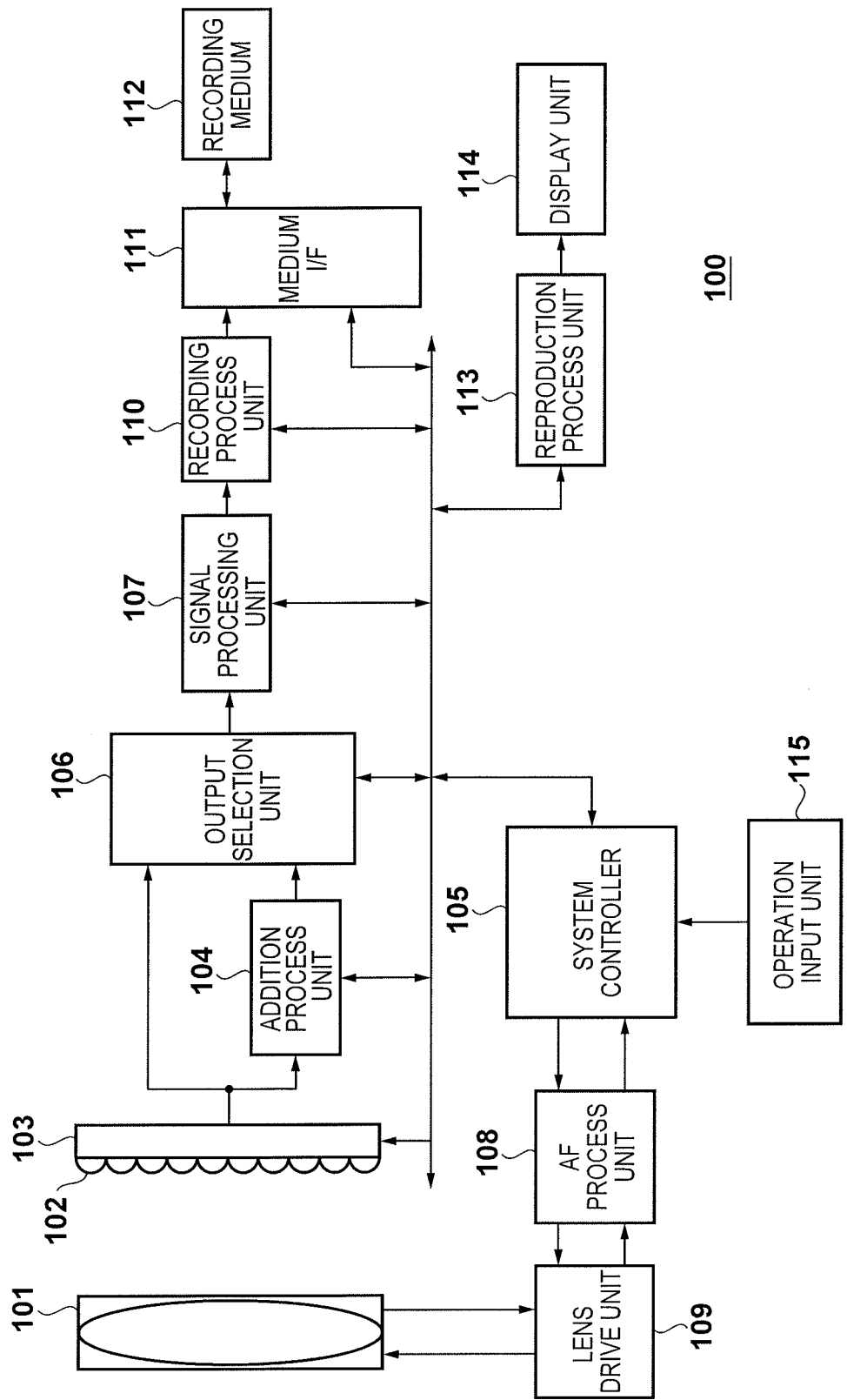

IMAGE PROCESSING APPARATUS, CONTROL METHOD, AND RECORDING MEDIUM FOR PROCESSING AN IMAGE SIGNAL FOR WHICH A FOCUS STATE CAN BE CHANGED AFTER IMAGE CAPTURE

BACKGROUND OF THE INVENTION

Field of the Invention

The present invention relates to image processing apparatuses, control methods, and recording media, and particularly to an image processing technique involved with an image signal for which a focus state can be changed after image capture.

Description of the Related Art

In recent years, some image sensing apparatuses perform pupil division on light flux which is reflected by a subject before being incident to the apparatus, perform photoelectric conversion on information about rays having different combinations of a pupil-division region to which light is incident and a direction in which light is incident, using an image sensing device, and records the resultant information. The image signal recorded by the apparatus is called light field information, light field (LF) data, etc. The image signal has information about rays having various angles of incidence, and therefore, an image related to an optical image which is incident from a particular direction, an image which is in focus at a particular subject distance, etc., can be generated after image capture (Japanese Patent Laid-Open No. 2009-021919, U.S. Pat. No. 4,410,804).

When microlenses are used to perform pupil division on incident light flux as described in Japanese Patent Laid-Open No. 2009-021919, an image which can be simply generated from an obtained image signal (hereinafter referred to as LF data) has the same number of pixels as there are microlenses used. On the other hand, the LF data has pixels the number of which is the pupil division number times the number of pixels in a generated image.

Therefore, when a moving image having frames each of which is a multi-pixel image is captured using the above image capture technique, a recording medium is required to have a data capacity which is several times as large as the moving image in order to record a series of LF data for generating the moving image. Therefore, in order to obtain a moving image which allows for adjustment of a focus state, etc., a recording medium is required to have a data capacity which is much larger than when a conventional moving image is recorded, and in addition, it may be difficult to capture a moving image over a long period of time.

SUMMARY OF THE INVENTION

The present invention was made in view of such problems in the conventional technique. The present invention provides an image processing apparatus, control method, and recording medium which efficiently reduce the amount of data to be recorded from which a moving image having different focus states can be generated.

The present invention in its first aspect provides an image processing apparatus comprising: an obtaining unit configured to obtain an image signal from which a reconstructed image having a predetermined focus state can be generated; a detection unit configured to detect the focus state of the image signal obtained by the obtaining unit; a generation unit configured to generate, from the image signal, a reconstructed image which is in focus at a predetermined subject distance; and an outputting unit configured to output the image signal or the reconstructed image generated by the generation unit, depending on the result of the detection of the focus state by the detection unit, wherein the outputting unit outputs the reconstructed image when the result of the detection is an in-focus state, and the image signal when the result of the detection is an out-of-focus state.

The present invention in its second aspect provides a method for controlling an image processing apparatus, comprising: obtaining an image signal from which a reconstructed image having a predetermined focus state can be generated; detecting the focus state of the obtained image signal; generating, from the image signal, a reconstructed image which is in focus at a predetermined subject distance; and outputting the image signal or the generated reconstructed image, depending on the result of the detection of the focus state, wherein the reconstructed image is output when the result of the detection is an in-focus state, and the image signal is output when the result of the detection is an out-of-focus state.

Further features of the present invention will become apparent from the following description of exemplary embodiments (with reference to the attached drawings).

BRIEF DESCRIPTION OF THE DRAWINGS

FIG. 1 is a block diagram showing a functional configuration of a digital video camera 100 according to an embodiment of the present invention.

DESCRIPTION OF THE EMBODIMENTS

Figure 2A:
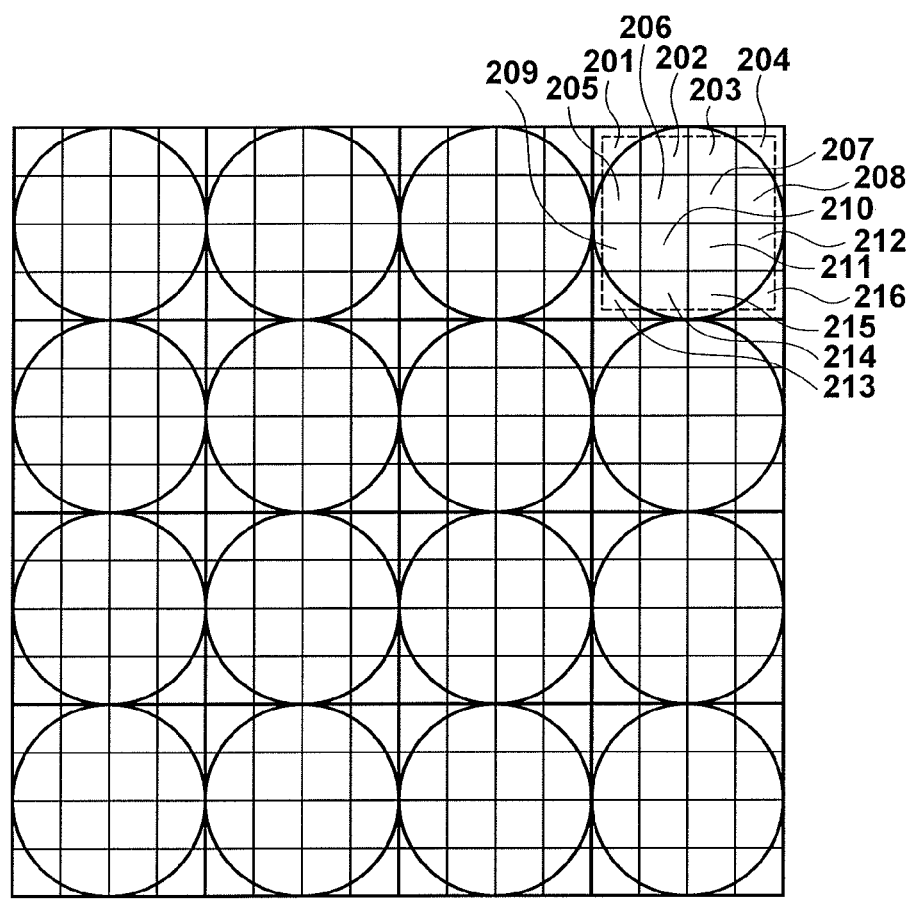
FIG. 2A is a diagram showing a correspondence between a microlens array 102 and an image sensing device 103 according to an embodiment of the present invention.

Illustrative embodiments of the present invention will now be described in detail with reference to the accompanying drawings. Note that, in the embodiments below, the present invention is applied to a digital video camera which can generate an image which is in focus at any subject distance, from an image signal having pixels corresponding to rays having different combinations of a divided pupil region through which the ray is passed and a direction in which the ray is incident, as an example image processing apparatus. However, the present invention is not limited to image sensing apparatuses, such as a digital video camera, and is applicable to any equipment that can generate, from such an image signal, an image which is in focus at any subject distance. As described below, the image signal is equivalent to an image signal including a plurality of images of the same subject captured and obtained at different positions. Therefore, the present invention is applicable to any equipment that can generate an image by selecting one from the plurality of images or compositing.

The following terms as used herein are defined as follows.

"LF Data"

An image signal which is output from an image sensing device 103 of a digital video camera 100 of this embodiment, and is obtained by applying thereto image processing involved with a predetermined development. Each pixel of LF data indicates a signal intensity corresponding to a ray having a different combination of a divided pupil region of an image sensing optical system 101 through which the ray is passed and a direction in which the ray is incident. LF data is also called "light field information."

"Reconstructed Image"

An image which is generated by reconstructing a ray distribution on any focus surface from LF data, and then adding up corresponding pixels. A plurality (a pupil division number) of divided pupil images each of which is generated from LF data and includes pixels which have been passed through the same divided pupil region, or images obtained from LF data for a plurality of viewpoints, may be positioned so that generated images of a subject which is located at a subject distance coincide with each other, and the values of corresponding pixels may be combined together (added up), thereby generating a reconstructed image.

<<Configuration of Digital Video Camera 100>>

FIG. 1 is a block diagram showing a functional configuration of a digital video camera 100 according to an embodiment of the present invention.

A system controller 105 is a CPU connected to, for example, a ROM and a RAM (not shown), and controls an operation of each block included in the digital video camera 100. Specifically, the system controller 105 reads an operating program for each block stored in the ROM, loads the operating program to the RAM, and executes the operating program, thereby controlling the operation of each block.

The image sensing device 103 is, for example, a CCD, a CMOS sensor, etc. The image sensing device 103 includes photoelectric conversion elements arranged in a two-dimensional array. The image sensing device 103 performs photoelectric conversion on an optical image which is formed on an image sensing surface by the image sensing optical system 101, to output an analog image signal. In this embodiment, the image sensing device 103 also functions as an A/D converter, and outputs the obtained analog image signal as a digital image signal. Also, in the description that follows, for the sake of simplicity, it is assumed that a development process is also performed in the process of A/D conversion.

Figure 2B:
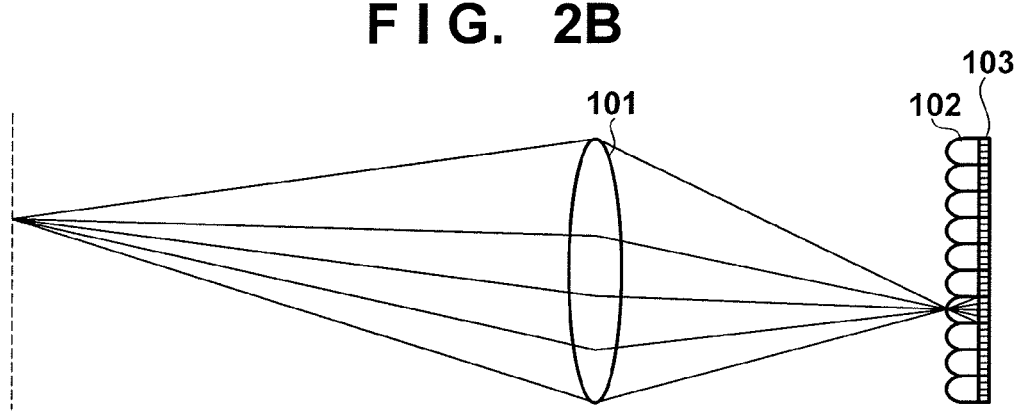
FIG. 2B is a diagram showing a relationship between an image sensing optical system 101, a microlens array 102, and an image sensing device 103 according to an embodiment of the present invention.

Note that, in this embodiment, a microlens array 102 is provided in an optical path which connects the image sensing optical system 101 and the image sensing device 103 together. As shown in FIG. 2A, each single microlens of the microlens array 102 is associated with a plurality of photoelectric conversion elements (hereinafter simply referred to as "pixels"). In the example of FIG. 2A, each single microlens is associated with 4×4 pixels 201 to 216. Specifically, light flux which is incident to a single microlens position through the image sensing optical system 101, is divided by the microlens into portions, which are then imaged on 16 pixels. Specifically, as shown in FIG. 2B, rays imaged on respective pixels associated with a single microlens have different divided pupil regions through which the rays are passed and different directions in which the rays are incident, and in addition, have different directions with respect to the same subject.

Thus, the image sensing device 103 of this embodiment generates LF data as a digital image signal. The generated LF data is output to an addition process unit 104 or an output selection unit 106.

The addition process unit 104 generates, from the LF data, a reconstructed image which is in focus at any subject distance, and outputs the reconstructed image to the output selection unit 106. For example, when a reconstructed image is generated which is in focus at a subject distance corresponding to the focus position of a focusing lens included in the image sensing optical system 101, the values of pixels of the LF data associated with the same microlens may be combined. In this case, the generated reconstructed image has the same number of pixels as there are microlenses included in the microlens array.

Note that, in this embodiment, a reconstructed image which can be generated from LF data is not limited to this. For example, not all the values of pixels associated with the same microlens need to be combined, and a portion of the pixels may be combined to generate a reconstructed image.

Alternatively, of the pixels associated with each microlens, only a pixel having the same positional relationship (e.g., only an upper left one of 4×4 pixels) may be extracted and sequentially arranged, whereby an image of a subject which is captured from a predetermined direction can be generated. Specifically, when each single microlens is associated with 16 pixels as shown in FIG. 2A, images of the same subject captured from 16 different directions can be generated from LF data. When a reconstructed image which is in focus on any subject is generated, these images of the subject captured from the different directions may be positioned and composited. Note that, in addition to this, after a reconstruction surface is set, the values of pixels corresponding to rays passed through regions corresponding to pixels of a reconstructed image may be combined to calculate pixel values of the reconstructed image, whereby a reconstructed image which is in focus at a subject distance which does not correspond to the focus position of the focusing lens can be generated.

Although, in this embodiment, the addition process unit 104 is assumed to output a reconstructed image, the addition process unit 104 may output, as a reconstructed image, an image of a subject which is captured from a predetermined direction as described above.

The output selection unit 106 outputs LF data, or a reconstructed image generated by the addition process unit 104, as an image signal to be recorded, to a signal processing unit 107, depending on a situation in which image capture is performed by the digital video camera 100.

The signal processing unit 107, when the image signal received from the output selection unit 106 is a reconstructed image, applies image processing, such as a gamma process, noise reduction process, white balance process, etc., to the reconstructed image, and outputs the resultant image to a recording process unit 110. Also, the signal processing unit 107, when the image signal received from the output selection unit 106 is LF data, outputs the image signal to the recording process unit 110 without changing the image signal.

The recording process unit 110 transmits the received image signal to a medium I/F 111, which then records the image signal to a recording medium 112 which is a recording device which is removably connected to the digital video camera 100. Specifically, for example, in the case of capturing a moving image, the recording process unit 110 converts the received image signal into a (video) stream data format before performing a process involved with recording, and records the moving image. Note that the recording process unit 110 may perform a suitable encoding process when necessary.

A reproduction process unit 113 reads and reproduces an image or a moving image which has been recorded to the recording medium 112 by the recording process unit 110, and displays the image on a display unit 114. Note that, in this embodiment, the reproduction process unit 113 can generate a reconstructed image from LF data as with the addition process unit 104, and, for example, during reproduction of a moving image, when frames include LF data, generates a reconstructed image which is in focus at any subject distance during reproduction. Also, it is assumed that the reproduction process unit 113, when an image or a moving image read by the recording process unit 110 has been encoded, performs a required decoding process.

An AF process unit 108 determines a focus state of LF data obtained during image capture, and when the focus state is the out-of-focus state, generates a drive signal for a lens drive unit 109 to achieve an in-focus state. Based on the drive signal, the lens drive unit 109 changes the position of the focusing lens of the image sensing optical system 101. The focus state of LF data is caused to be the in-focus state by, for example, a phase-difference detection method which uses images from two different directions which are generated by the addition process unit 104, or a contrast detection method which uses a reconstructed image which is generated for a subject distance corresponding to the current focus position of the focusing lens, etc.

Figure 3:
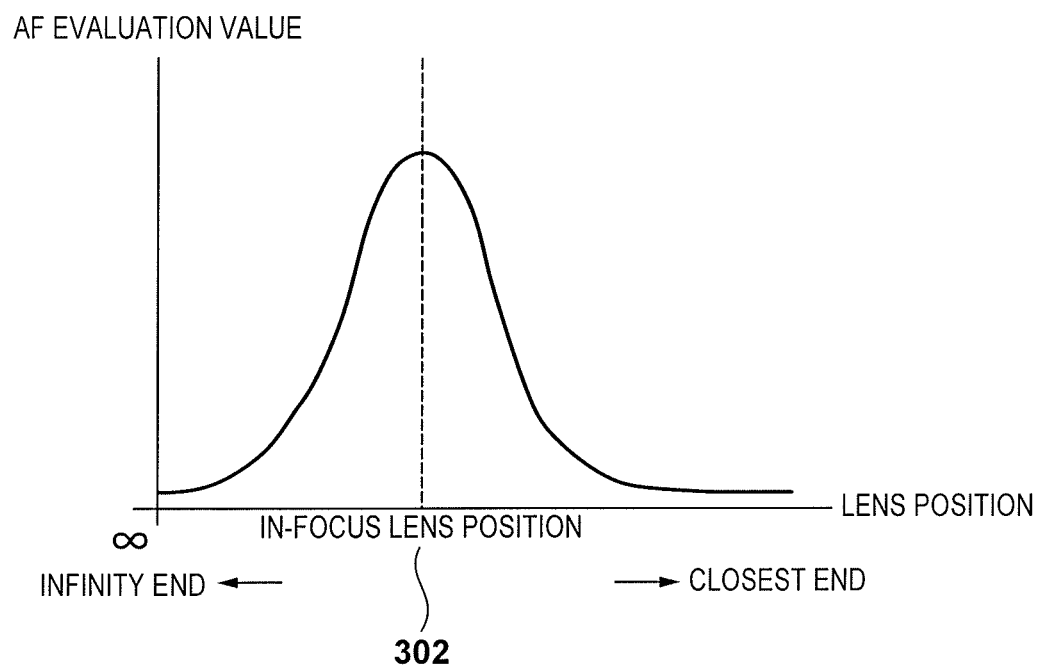
FIG. 3 is a diagram showing a relationship between AF evaluation values and focusing lens positions according to an embodiment of the present invention.

The AF process unit 108 calculates an AF evaluation value based on a phase difference detected during drive of the focusing lens, to find a lens position at which the evaluation value has a peak value as shown in FIG. 3. Specifically, the AF process unit 108, when detecting a change in transition of the AF evaluation value from increase to decrease or from decrease to increase, generates a drive signal which reverses the direction in which the focusing lens is driven. By repeatedly performing this operation, the AF process unit 108 finds a focusing lens position at which the evaluation value has a peak value.

Figure 4:
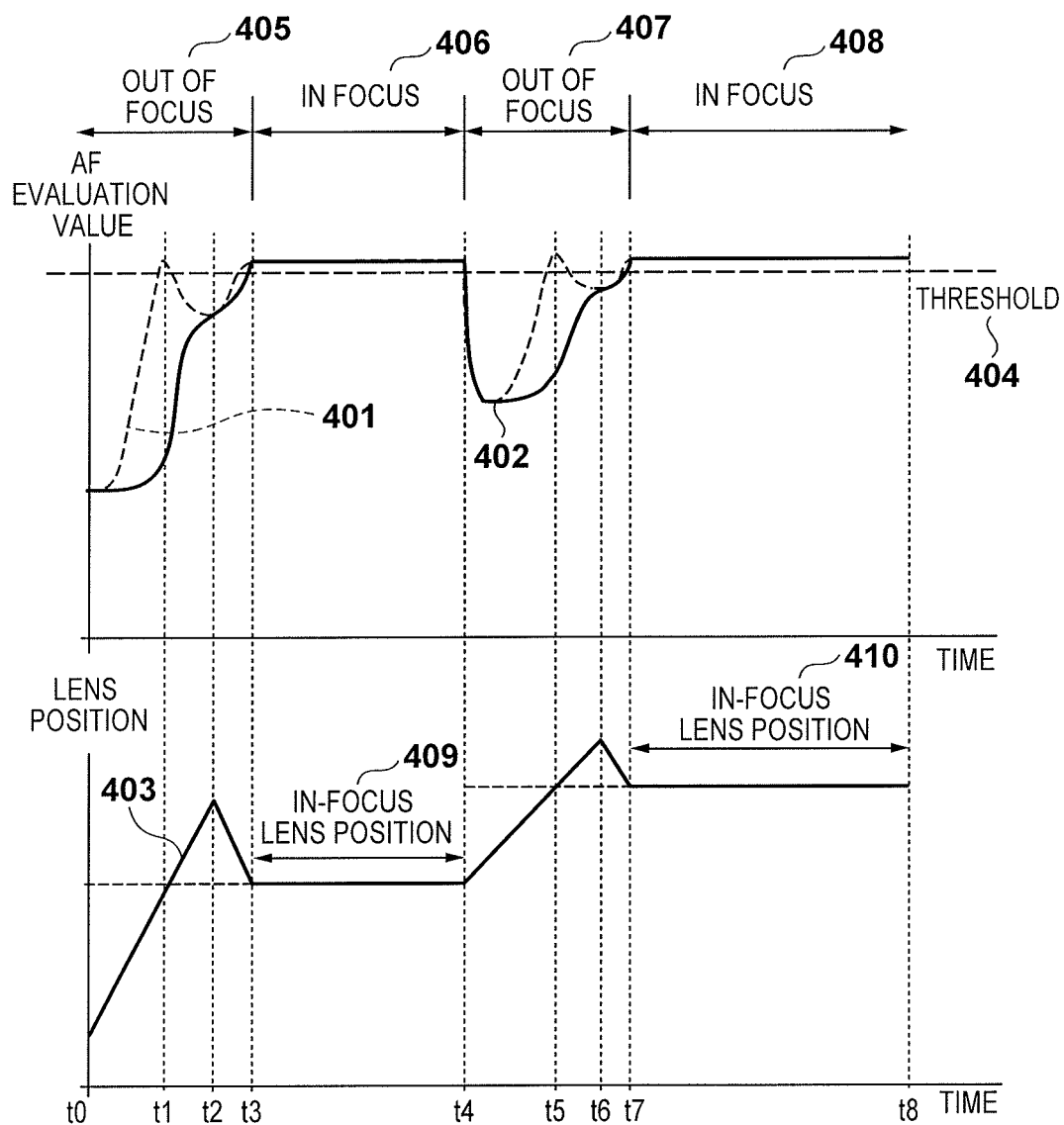
FIG. 4 is a diagram for describing an in-focus determination curve according to an embodiment of the present invention.

Note that, it may be determined whether or not LF data is in the in-focus state, based on whether or not an in-focus determination curve 402 shown in FIG. 4 exceeds a threshold. The threshold which is used to determine whether or not LF data is in the in-focus state, depends on the resolution of an image which can be generated from LF data, and therefore, may be determined based on the number of photoelectric conversion elements associated with each single microlens.

FIG. 4 illustrates changes in the focusing lens position and the AF evaluation value. In FIG. 4, a dashed line waveform in an upper graph is a curve 401 representing the AF evaluation value, and a solid line waveform in a lower graph is a curve 403 representing the position of the focusing lens. The horizontal axes of the upper and lower graphs both represent time. The vertical axis of the upper graph represents the magnitude of the AF evaluation value, and the vertical axis of the lower graph represents the focusing lens position.

For example, at time t0, the AF process unit 108 generates a drive signal which is used to move the focusing lens from the ∞ (infinity) end toward the closest end, and causes the lens drive unit 109 to start lens drive. When the focusing lens passes the in-focus position (peak value) at time t1, the AF evaluation value stops increasing and begins decreasing. When the AF evaluation value begins decreasing, the AF process unit 108 generates a drive signal which is used to change the lens drive direction from the closest end toward the ∞ end. As a result, the AF evaluation value begins increasing again (time t2 to t3). At this time, the AF process unit 108 stores the AF evaluation value at the peak, and moves the focusing lens to a lens position corresponding to the peak to obtain an in-focus state 407 (time t3).

For example, when the focus state is transitioned from the in-focus state to the out-of-focus state due to movement of a subject on which the focus has been placed, the AF process unit 108 controls the focusing lens position in a manner similar to that which is performed from t0 to t4, to obtain an in-focus position 408 (t4 to t8). Alternatively, a focus detection apparatus with the phase difference method which is provided separately from the image sensing device may be used to perform focus detection when necessary. Note that a subject on which the focus should be placed may be found by image analysis, or may be designated by the user through an operation input unit 115, where the user's input is received as appropriate during starting up.

The AF process unit 108 detects local minima (t2 and t6 of FIG. 4) from the AF evaluation values 401 thus obtained, calculates values of the in-focus determination curve 402 based on the local minima, and outputs these values to the system controller 105. The system controller 105 determines whether or not the values exceed the threshold based on the in-focus determination curve, thereby determining whether the focus state of the corresponding LF data is the in-focus state or the out-of-focus state.

The operation input unit 115 is a user interface which is included in the digital video camera 100, such as a shooting button, a touch panel sensor provided on a surface of the display unit 114, etc. The operation input unit 115, when detecting the user's operation to the interface, determines what is requested by the operation, and outputs a corresponding control signal to the system controller 105.

<<Moving Image Capture Process>>

Figure 5:
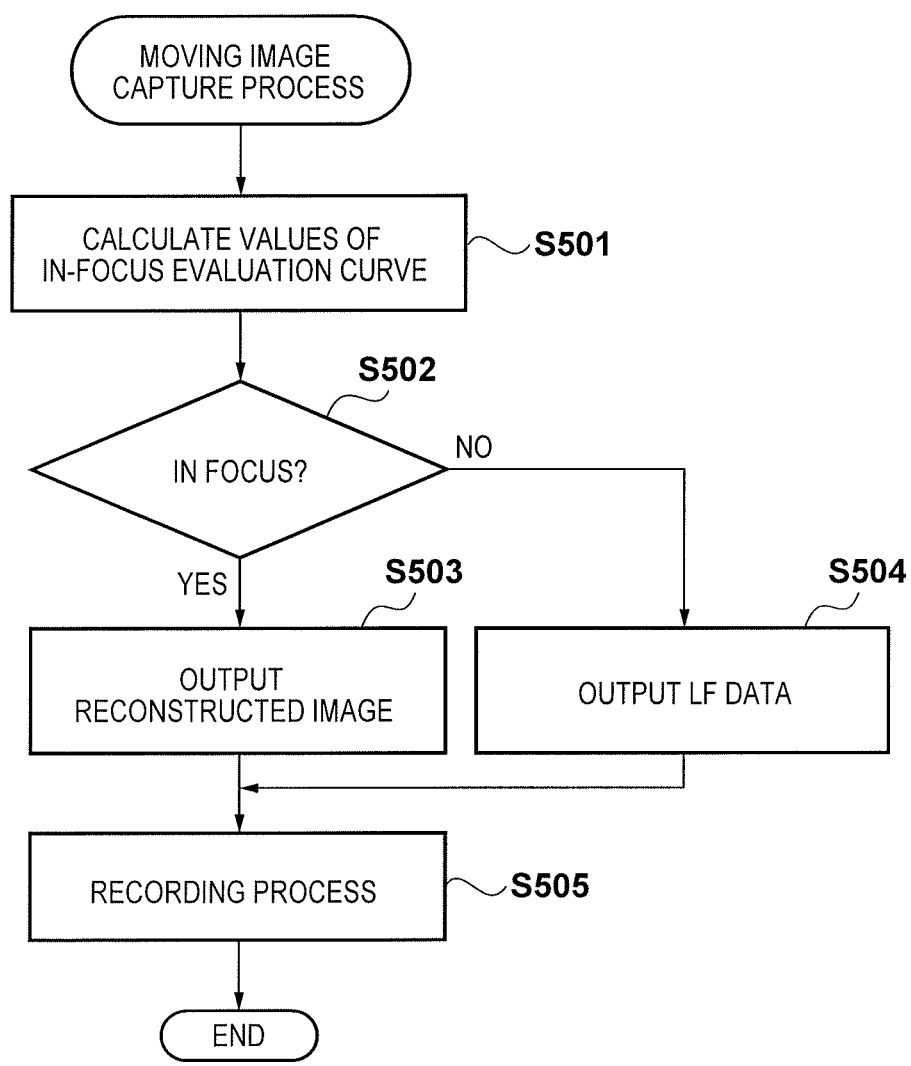
FIG. 5 is a flowchart illustrating a moving image capture process performed by a digital video camera 100 according to an embodiment of the present invention.

A moving image capture process of the digital video camera 100 thus configured of this embodiment will be specifically described with reference to a flowchart of FIG. 5. The process corresponding to the flowchart can, for example, be implemented by the system controller 105 reading a corresponding process program stored in the ROM, loading the program to the RAM, and executing the program. Note that the moving image capture process is, for example, assumed to be started when the system controller 105 receives, from the operation input unit 115, a control signal indicating an instruction to perform image capture when the digital video camera 100 is in the moving image capture mode. It is also assumed that the moving image capture process is repeated each time the output selection unit 106 sequentially obtains LF data from the image sensing device 103 after the instruction to perform image capture.

In step S501, the AF process unit 108 calculates values of an in-focus determination curve involved with LF data (current LF data) which has just been output by the image sensing device 103, under the control of the system controller 105.

In step S502, the system controller 105 determines whether or not the current LF data is in the in-focus state, with reference to values of the in-focus determination curve calculated by the AF process unit 108. The system controller 105 causes the process to proceed to step S503 when determining that the current LF data is in the in-focus state, and to step S504 when determining that the current LF data is not in the in-focus state. Here, in step S502, output data may also be selected by determining whether or not moving image capture has just begun. Specifically, during the beginning of moving image capture, the current IF data is mostly in the out-of-focus state, and therefore, the AF process unit 108 may not perform the in-focus determination, and control may proceed to step S504. Also, when the user issues an instruction to change subjects on which the focus should be placed, control may proceed to step S504 without the AF process unit 108 performing the in-focus determination. In this case, it may also be determined whether or not subjects on which the focus should be placed, before and after changing the subjects, have different subject distances.

In step S503, the output selection unit 106 outputs a reconstructed image which has been generated from the current LF data by the addition process unit 104, as an image signal to be recorded, to the signal processing unit 107 under the control of the system controller 105.

On the other hand, when it is determined that the current LF data is not in the in-focus state, in step S504 the output selection unit 106 outputs the current LF data, as an image signal to be recorded, to the signal processing unit 107.

In step S505, the system controller 105 causes the signal processing unit 107 and the recording process unit 110 to perform necessary processes on the image signal output by the output selection unit 106, and thereafter, causes the recording medium 112 to record the resultant image signal, and ends the moving image capture process.

Thus, in the digital video camera 100 of this embodiment, different image signals can be recorded as frames of a moving image, depending on whether the focus state is the in-focus state or the out-of-focus state when moving image capture is performed. Specifically, LF data is not recorded during a period of time when the focus state is the in-focus state and therefore changing of the focus is less required, and therefore, the data amount of a moving image recorded in the recording medium 112 can be reduced.

Figure 6:
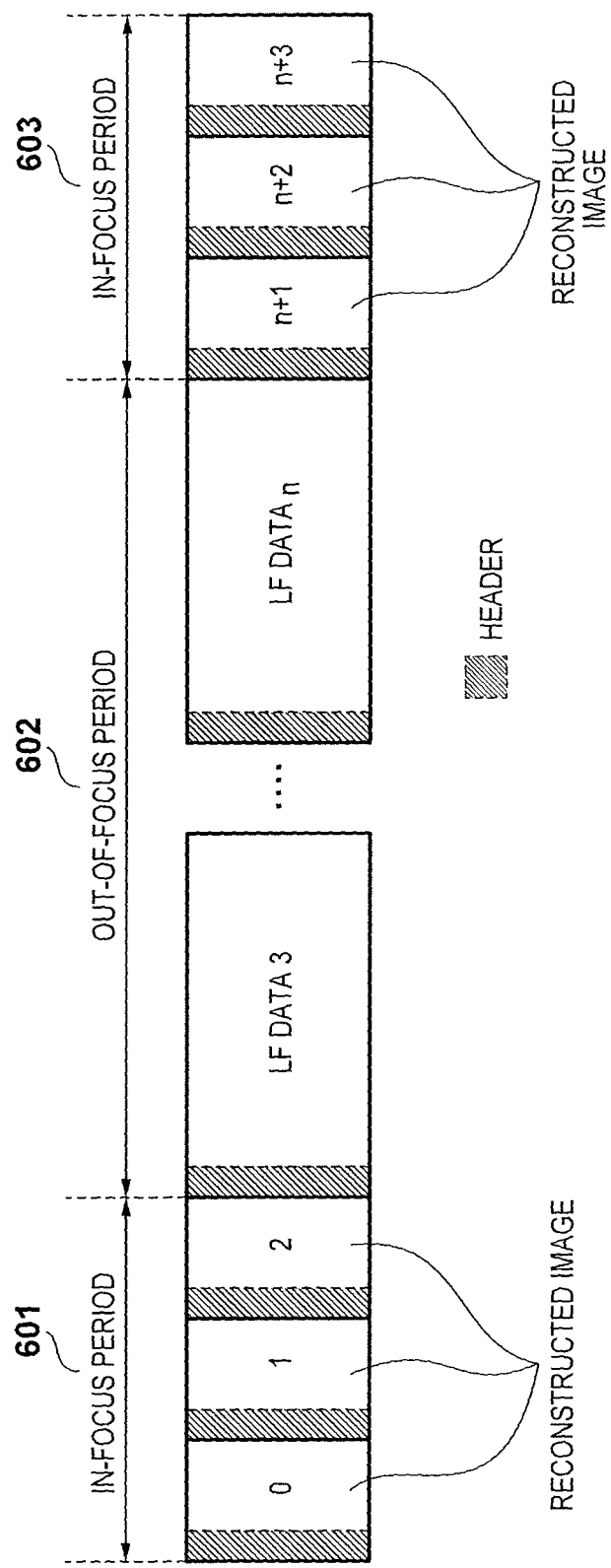
FIG. 6 is a diagram showing a data structure of a moving image recorded by a digital video camera 100 according to an embodiment of the present invention.

The stream data (moving image) may, for example, be recorded in a format that, as shown in FIG. 6, information indicating whether or not the focus state is the out-of-focus state is added as a header to each image signal (LF data or a reconstructed image). When a recorded moving image is reproduced, a reconstructed image may be directly reproduced as frames for data of in-focus periods 601 and 603, and a reconstructed image may be generated and reproduced from LF data by the reproduction process unit 113 for data of an out-of-focus period 602. The reconstructed image generated from LF data may be generated so that the focus is placed on a subject located in a predetermined region, such as a center of an image, or on a subject located in a region designated by the user. At this time, information about the region designated by the user may also be recorded in the header so that the information can be referred to during reproduction in other equipment.

Figure 7:
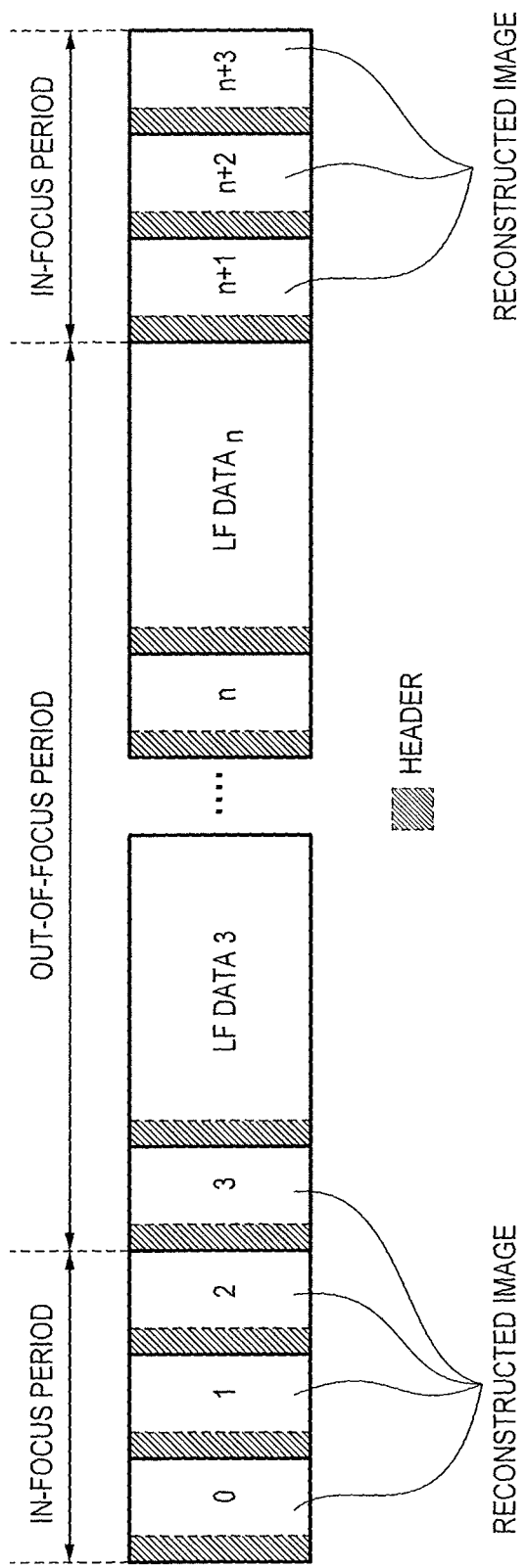
FIG. 7 is a diagram showing another data structure of a moving image recorded by a digital video camera 100 according to an embodiment of the present invention.

Although, in this embodiment, LF data is sequentially recorded as frame data in recording of a moving image during a period of time when the focus state is the out-of-focus state, the present invention is not limited to this. The moving image thus recorded cannot be reproduced by equipment which cannot generate a reconstructed image from LF data. Therefore, for example, as shown in FIG. 7, both a reconstructed image and LF data may be recorded as frame data during the out-of-focus period. Specifically, reconstructed images are included in data of all frames, and therefore, the moving image can be reproduced by equipment incapable of generating a reconstructed image from LF data.

Although, in this embodiment, a fixed threshold is used in determination of whether or not the focus state is the in-focus state, the present invention is not limited to this. For example, during a period of time from the beginning of moving image capture until a predetermined time has elapsed, or when a subject on which the focus should be placed is changed to another during image capture, the state of a subject on which the focus should be placed tends to fluctuate largely, and the reliability of the subject state is low, and therefore, the threshold may be set to be relatively high so that it is difficult to determine that the focus state is the in-focus state. Also, for example, when the digital video camera 100 is set to a mode in which a moving subject, such as a child, a person playing a sport, etc., is captured, or a macro photography mode, the threshold may be set to be relatively high. On the other hand, when the digital video camera 100 is set to a mode in which a still subject, such as a landscape, a night landscape, etc., is captured, or a portrait mode, the state fluctuation seems to be conversely small, and therefore, the threshold may be set to be relatively low so that the data amount of a moving image to be recorded is reduced.

Although, in this embodiment, a method has been described for reducing the data amount of a moving image recorded in moving image capture, the method may also be used in still image capture. Specifically, for an image which is captured in a state in which changing of the focus is less required because the focus state is the in-focus state, the necessity of recording LF data is low, and therefore, by recording only a reconstructed image, the data amount of a recorded image can be reduced.

As described above, the image processing apparatus of this embodiment can efficiently reduce the amount of data from which a moving image having different focus states can be generated.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-217860, filed Oct. 18, 2013, which is hereby incorporated by reference herein in its entirety.

What is claimed is:

1. An image processing apparatus comprising:
   an obtaining unit configured to sequentially obtain an image signal from which reconstructed images having a plurality of different focus states can be generated;
   a detection unit configured to detect the focus state of the image signal obtained by the obtaining unit;
   a generation unit configured to generate a reconstructed image from the image signal; and
   an outputting unit configured to generate and output moving image data including, as frame data, the image signal and the reconstructed image generated by the generation unit, wherein
   in a case where the result of the detection of the focus state by the detection unit is an in-focus state, the outputting unit includes the reconstructed image but does not include the image signal from which the reconstructed image is generated as the frame data of the moving image data, and in a case where the result of the detection is an out-of-focus state, the outputting unit includes the image signal as the frame of the moving image data.

2. The image processing apparatus according to claim 1, wherein
   the detection unit calculates an in-focus evaluation value for a subject in the image signal, and detects the in-focus state in a case where the in-focus evaluation value meets a predetermined criterion.

3. The image processing apparatus according to claim 1, wherein
   the outputting unit additionally outputs the reconstructed image generated by the generation unit in a case where the result of the detection is the out-of-focus state.

4. The image processing apparatus according to claim 1, wherein
   the generation unit combines values of pixels extracted from the image signal to determine a value of each pixel of the reconstructed image.

5. The image processing apparatus according to claim 1, wherein
   the detection unit detects the focus state of the image signal according to an evaluation value which is obtained based on the image signal using a phase-difference detection method or a contrast detection method.

6. The image processing apparatus according to claim 5, wherein
   the image signal includes signals obtained by causing light flux incident to a predetermined position of an image sensing surface to enter a plurality of photoelectric conversion elements and thereby splitting the light flux, or signals of images of a subject captured from a plurality of positions, and
   the detection unit detects the focus state of the image signal by comparing the evaluation value with a threshold which is determined based on the number of portions into which the light flux is split in the image signal or the number of images included in the image signal.

7. The image processing apparatus according to claim 1, further comprising:
   a selection unit configured to select a subject in the image signal,
   wherein
   the outputting unit, in a case where the selection unit selects a different subject, outputs the image signal.

8. The image processing apparatus according to claim 1, wherein
   the outputting unit, in a case where the obtaining unit begins sequentially obtaining the image signal, outputs the image signal.

9. The image processing apparatus according to claim 1, wherein
   the image processing apparatus is an image sensing apparatus including an image capture unit configured to perform image capture by causing light flux incident to a predetermined position of an image sensing surface to enter a plurality of photoelectric conversion elements and thereby splitting the light flux, and output the image signal.

10. The image processing apparatus according to claim 1, wherein
    the image processing apparatus is an image sensing apparatus including an image capture unit configured to capture images of a subject from a plurality of positions, and outputs the image signal including the images obtained for the plurality of positions.

11. A method for controlling an image processing apparatus, comprising:
    sequentially obtaining an image signal from which reconstructed images having a plurality of different focus states can be generated;
    detecting the focus state of the obtained image signal;
    generating a reconstructed image from the image signal; and
    generating and outputting moving image data including, as frame data, the image signal and the generated reconstructed image,
    wherein
    in a case where the result of the detection of the focus state by the detection unit is an in-focus state, the frame data of the moving image data includes the reconstructed image but does not include the image signal from which the reconstructed image is generated, and in a case where the result of the detection is an out-of-focus state, the frame data of the moving image data includes the image signal.

12. A non-transitory computer readable storage medium storing a program that causes a computer to execute the following operations:
    sequentially obtaining an image signal from which reconstructed images having a plurality of different focus states can be generated;
    detecting the focus state of the obtained image signal;
    generating a reconstructed image from the image signal; and
    generating and outputting moving image data including, as frame data, the image signal and the generated reconstructed image,
    wherein
    in a case where the result of the detection of the focus state by the detection unit is an in-focus state, the frame data of the moving image data includes the reconstructed image but does not include the image signal from which the reconstructed image is generated, and in a case where the result of the detection is an out-of-focus state, the frame data of the moving image data includes the image signal.

\* \* \* \* \*